US009710714B2

(12) United States Patent
Chen et al.

(10) Patent No.: US 9,710,714 B2
(45) Date of Patent: Jul. 18, 2017

(54) FUSION OF RGB IMAGES AND LIDAR DATA FOR LANE CLASSIFICATION

(71) Applicant: Nokia Technologies Oy, Espoo (FI)

(72) Inventors: Xin Chen, Evanston, IL (US); Andi Zang, Chicago, IL (US); Xinyu Huang, Cary, NC (US)

(73) Assignee: Nokia Technologies Oy, Espoo (FI)

( * ) Notice: Subject to any disclaimer, the term of this patent is extended or adjusted under 35 U.S.C. 154(b) by 171 days.

(21) Appl. No.: 14/816,808

(22) Filed: Aug. 3, 2015

(65) Prior Publication Data

US 2017/0039436 A1 Feb. 9, 2017

(51) Int. Cl.
*G06K 9/00* (2006.01)
*G06K 9/32* (2006.01)
(Continued)

(52) U.S. Cl.
CPC .......... *G06K 9/00798* (2013.01); *G01S 17/02* (2013.01); *G06K 9/3241* (2013.01); *G06K 9/481* (2013.01); *G06T 5/50* (2013.01); *G06T 7/0081* (2013.01); *G06T 7/408* (2013.01); *G06T 2207/10028* (2013.01); *G06T 2207/20221* (2013.01)

(58) Field of Classification Search
None
See application file for complete search history.

(56) References Cited

U.S. PATENT DOCUMENTS 8,194,927 B2    6/2012  Zhang et al.
8,199,977 B2 *  6/2012  Krishnaswamy .. G06K 9/00201
                                                    345/589

(Continued)

FOREIGN PATENT DOCUMENTS

WO    WO03001472    1/2003

OTHER PUBLICATIONS

Gopalan et al., A learning approach towards detection and tracking of lane markings, 2012, National Institute of Stands and Technology.

(Continued)

*Primary Examiner* — Tahmina Ansari
(74) *Attorney, Agent, or Firm* — Lempia Summerfield Katz LLC

(57) ABSTRACT

Point cloud data is received and a ground plane is segmented. A two-dimensional image of the segmented ground plane is generated based on intensity values of the segmented ground plane. Lane marking candidates are determined based on intensity within the generated two-dimensional image. Image data is received and the generated two-dimensional image is registered with the received image data. Lane marking candidates of the received image data are determined based on the lane marking candidates of the registered two-dimensional image. Image patches are selected from the two-dimensional image and from the received image data based on the determined lane markings. Feature maps including selected image patches from the registered two-dimensional image and received data are generated. The set of feature maps are sub-sampled, and a feature vector is generated based on the set of feature maps. Lane markings are determined from the generated feature vector.

20 Claims, 12 Drawing Sheets

(51) Int. Cl.
  *G06K 9/48* (2006.01)
  *G06T 7/00* (2017.01)
  *G06T 5/50* (2006.01)
  *G06T 7/40* (2017.01)
  *G01S 17/02* (2006.01)

(56) References Cited

U.S. PATENT DOCUMENTS

| | | | |
|---|---|---|---|
| 2011/0205338 A1* | 8/2011 | Choi | G06T 7/74 348/46 |
| 2012/0062747 A1* | 3/2012 | Zeng | B60W 40/06 348/149 |
| 2014/0347484 A1 | 11/2014 | Byun et al. | |
| 2015/0120244 A1* | 4/2015 | Ma | G01C 15/00 702/172 |
| 2015/0324658 A1* | 11/2015 | Zhang | G06K 9/52 382/203 |
| 2016/0364917 A1* | 12/2016 | Zhang | G06K 9/00201 |
| 2017/0039436 A1* | 2/2017 | Chen | G06K 9/00798 |

OTHER PUBLICATIONS

Grisleri et al., Perception and data fusion on autonomous vehicles: the TerraMax™ experience, accessed Jun. 26, 2015.

Huval et al., An Empirical Evaluation of Deep Learning on Highway Driving, 2015, arXiv preprint arXiv:1504.01716.

Ji et al., 3D Convolutional Neural Networks for Human Action Recognition, 2013, Pattern Analysis and Machine Intelligence.

Kim et al., Classification of Road Images for Lane Detection, accessed Jun. 25, 2015.

Longjard et al., Automatic Lane Detection and Navigation Using Pattern Matching Mode, Sep. 15-17, 2007, Proceedings of the 7th WSEAS International Conference on Signal, Speech and Image Processing.

Prokhorov, A Convolutional Learning System for Object Classification in 3D Lidar Data, Mar. 29, 2010.

Solyman, Improving Automatic Feature Detection from Lidar Intensity by Integration of Lidar Height Data and True Orthoimage from Digital Camera, 2012.

\* cited by examiner

96

98

FUSION OF RGB IMAGES AND LIDAR DATA FOR LANE CLASSIFICATION

FIELD

The following disclosure relates to identifying road markings such as lanes through image processing, and more particularly, to the fusion of color images and point cloud data using convolutional neural networks for lane classification.

BACKGROUND

Computer based navigation systems such as autonomous driving vehicles and map-aided localization have created a need for lane detection and lane classification from road images. Lane detection and classification is frequently established based on video, photographs, scans, existing maps and point cloud data (such as remote sensing using infrared lasers, often called Light Detection And Ranging, or LiDAR) information collected. One approach to identification of these markers is the extraction of markers based on color, shape, or other image features from street level imagery. Construction and changes to roadway systems create a constantly changing environment, requiring continual maintenance and upkeep of maps to provide current and accurate maps. There is a high cost in the use of LiDAR data acquisition to acquire frequent changes in lane markings. The accuracy of current image-based lane marking and classification is further challenging due to lighting, time of day, occlusions, and the shear variety of markers. Some conventional handcrafted methods relying on one or two dimensional filters fail to accommodate a variety of driving and lighting conditions.

SUMMARY

In one embodiment, point cloud data is received and a ground plane is segmented from the point cloud data. A two-dimensional image of the segmented ground plane is generated based on intensity values of the segmented ground plane. Lane marking candidates are determined based on intensity within the generated two-dimensional image. Image data is received, and the generated two-dimensional image is registered with the received image data. Lane marking candidates of the received image data are determined based on the determined lane marking candidates of the registered two-dimensional image. A plurality of image patches from the registered two-dimensional image and from the registered image data are selected based on the determined lane markings.

In one embodiment, an apparatus is provided comprising at least one processor and at least one memory including computer program code for one or more programs. The at least one memory and the computer program code configured to, with the at least one processor, cause the apparatus to receive point cloud data and segment a ground plane from the point cloud data. The computer program code and processor may further cause the apparatus to generate a two-dimensional image of the segmented ground plane based on intensity values of the segmented ground plane, determine lane marking candidates based on intensity within the two-dimensional image, receive image data, and register the generated two-dimensional image with the received image data. The computer program code and processor may further cause the apparatus to determine lane marking candidates of the received image data based on the determined lane marking candidates of the registered two-dimensional image, select a plurality of image patches from the two-dimensional image and from the received image data based on the determined lane markings, and generate a plurality of feature maps from the plurality of image patches wherein the plurality of image patches includes selected image patches from the registered two-dimensional image and selected image patches from the received image data. The computer program code and processor may additionally cause the apparatus to sub sample the set of feature maps, generate a feature vector based on the set of feature maps, and determine lane markings from the generated feature vector based on intensity.

In yet another embodiment, a non-transitory computer readable medium including instructions that when executed are operable to receive a plurality of color images, receive point cloud data, and generate a plurality of two-dimensional images based on intensity of the point cloud data. The non-transitory computer readable medium may further include instructions that when executed are operable to register each of the generated two-dimensional images with color images of the plurality of color images based on geolocation and pose, generate a plurality of feature maps from each registered two-dimensional image and its corresponding color image based on a classifier; wherein the classifier is based on positive lane marking examples and negative lane marking examples, sub sample the plurality of feature maps, generate a feature vector based on the plurality of feature maps, and determine lane markings from the generated feature vector based on intensity.

BRIEF DESCRIPTION OF THE DRAWINGS

Exemplary embodiments of the present invention are described herein with reference to the following drawings.

DETAILED DESCRIPTION

Lane markings may be painted on roadways using reflective paint. The reflectivity of the paint can be identified in point cloud data set based on its infrared reflective intensity. One challenge in using this information is the presence of other high intensity areas in the point cloud data set, which may include guardrails, cars, grass, road signs, and the like. Machine learning algorithms can be used to remove areas of high intensity that are not lane markings. The subject technology for lane classification uses the fusion of color images and point cloud intensity data train convolutional neural networks (CNNs) in order to classify image patches as lane markings and non-lane markings.

One goal of the disclosure is to use the fusion of point cloud data and images to extract lane markings. A further goal of the disclosure is to depart from handcrafted feature approaches by using deep learning methods to determine lane markings and classification. A further goal of the disclosure is the creation of a robust system that is not negatively impacted by shadows or occlusions in acquired roadway data.

The capabilities of the subject technology for lane classification are applicable to autonomous driving vehicles and map-aided localization. The lane markings established using the subject technology can assist in the creation of lane-level digital maps that may be generated in advance. The subject technology for lane classification may additionally aid in autonomous vehicle navigation, which must operate in real-time under a variety of lighting and driving conditions.

The use of deep learning algorithms to determine lane classification requires a training set. The training set of the present disclosure includes both point cloud data and imagery, such as LiDAR point cloud data including intensity information and street level color images, respectively. The training set may include image patches of positive examples of lane markings as well as negative examples of lane markings. Large data sets are preferable to create more accurate results from the deep learning algorithm. In order to provide a large data set, two-dimensional images based on intensity data from the point cloud data are used in addition to photographic images. Both positive lane marking examples and negative lane marking examples further provide a large data set for training purposes.

Figure 1:
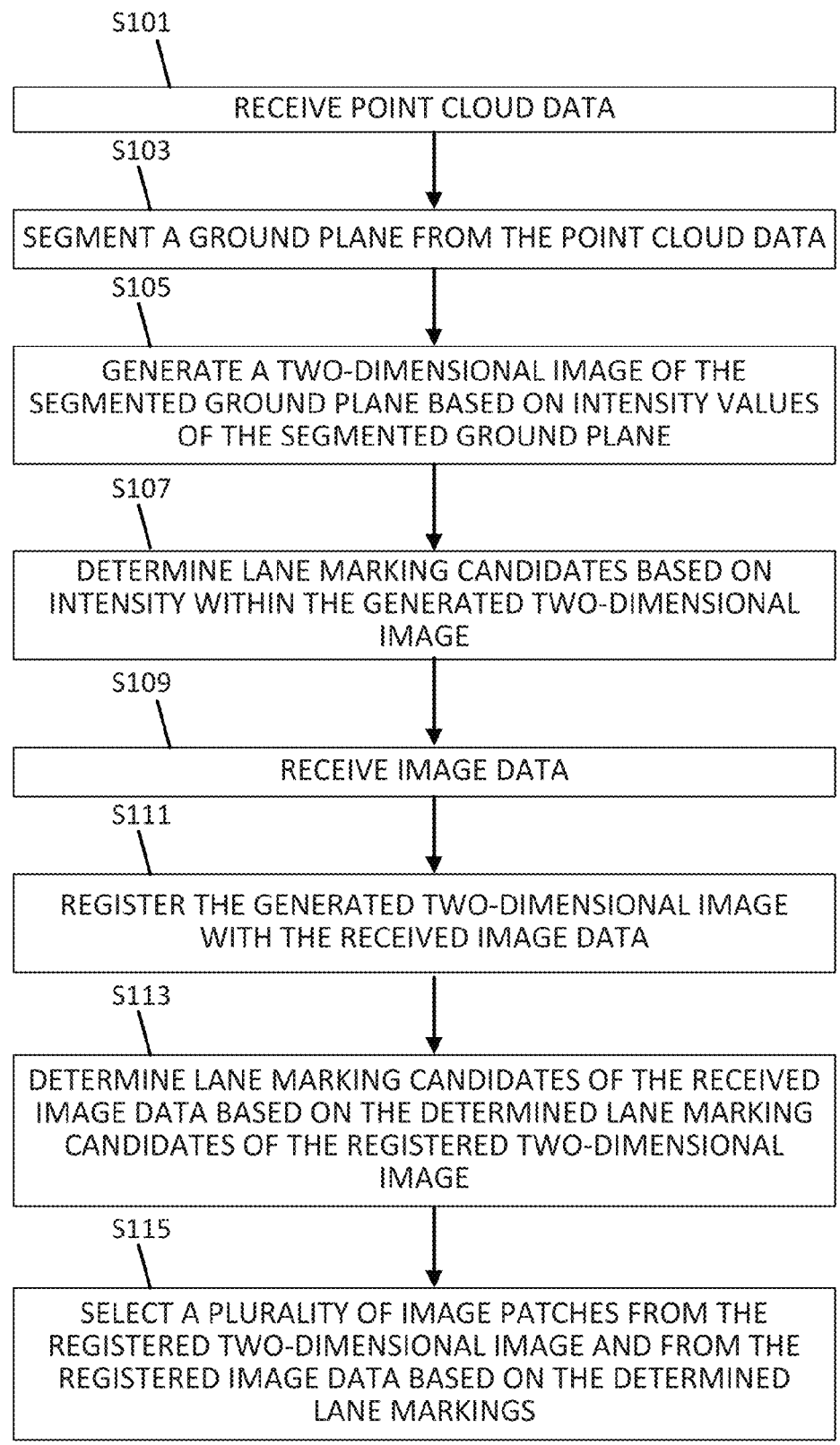
FIG. 1 is a flow diagram in accordance with the subject technology for lane classification.

In order to construct a training set of images for the CNN, images are pre-processed in order to generate two-dimensional point cloud data based images for the corresponding color images. FIG. 1 is a flow chart of a method of the subject technology for lane classification that may be performed by server 125 to obtain a training data set. Acts are described with reference to the system and components depicted in FIGS. 10-12. Additional, different, or fewer acts may be provided. Acts may be performed in orders other than those presented herein. In act S101, server 125 receives point cloud data. Point cloud data may be collected using moving vehicles 129 and or mobile devices 122. Street level image captures, such as high resolution photographs may be simultaneously collected.

In act S103, the ground plane is segmented from the point cloud data by the server 125. The ground plane may be segmented by thresholding based on height. A threshold value may be selected. One non-limiting example of a threshold value may be one meter. The ground point is determined from the vehicle trajectory as the minimum value on the z axis of the point cloud data sensor. All three-dimensional point cloud data points that are within the threshold distance from the minimum value on the z axis are selected, and all coordinates outside the threshold are removed. Alternatively, the ground plane may be determined by computing the normal of a plurality of points of the three-dimensional point cloud. Segmentation can then be performed based on the normal directions of the point. The normal of the points on the ground plane should be upright and consistent. The ground plane may further be determined through the use of plane fitting algorithms. The segmentation of the ground plane cuts down on processing time by removing irrelevant portions of the data prior to computation. Because irrelevant portions of the data set are removed, the accuracy of positive and negative lane marking examples is improved.

In act S105, a two-dimensional image of the segmented ground plane is generated by processor 300 of server 125 based on intensity values of the segmented ground plane. In act S107, lane marking candidates are determined based on intensity within the generated two-dimensional image. Lane markings may be determined via processor 300 by computing the convex hull of white pixels of the generated two-dimensional image. The convex hull may be used to segment the color images. Image patches may be taken exclusively from within the convex hull for the positive lane marking examples in the training set. Various image processing techniques may be applied to the generated two-dimensional image to create a more robust image. One example is to increase the contrast of the generated two-dimensional image based on intensity values of the segmented point cloud data. A further example is to smooth the gaps between projected points on the generated two-dimensional image. Images may be stretched to enhance contrast of the intensity. Noise may be further removed using median filtering, binarization of image intensities, and filling the gaps between projected points based on image erosion and dilation. Such image processing enhancements further a goal of the disclosure of creating clean data for better identification of lane markings and classification. The use of point cloud data to determine the lane markings provides a more robust classification as it is less sensitive to changes in lighting conditions. Point cloud data is frequently obtained using LiDAR sensors with lower frame rates than those of cameras, resulting in fewer occlusions, particularly occlusions such as other vehicles.

In act S109, image data is received by server 125. The image data may include color photographs obtained from a mobile device 122 and/or vehicle 129. A color image may be acquired using the RGB color model (containing separate values for red, green, and blue) transformed to the cylindrical-coordinate representation based on hue, saturation, and value using the HSV color model, which provides the benefit of reducing sensitivities to lighting conditions. The image data and the point cloud data may have been collected simultaneously. Alternatively, the image data and the point cloud data may be collected at different times. Geolocation and pose data may be collected via mobile device 122 or vehicle 129 for both the image data and the point cloud data in order to facilitate matching point cloud data and image data that have been collected at different times. Point cloud data and image data collected at different times may be aligned by using a camera projection matrix. This camera projection matrix could be estimated via camera calibration techniques. The camera projection matrix may be estimated by maximizing the mutual information between camera images and projected LiDAR features.

In act S111, the generated two-dimensional image is registered with the received image data by the server 125. The registration of the generated two-dimensional image may be performed, via processor 300 of server 125 by registering lane markings from the two-dimensional image to the lane markings in received image data from the same geolocation and pose. The registration may be achieved by projecting only marking candidates from the generated two-dimensional image for the creation of positive examples. Negative examples may be registered by projecting only non-marking candidates. The identification of lane markings is performed first on the images based on the point cloud data because the lane markings are easier to detect because reflectivity of the lane markings is identified in intensity data more clearly than visual identification of lane markings in street level photographs.

Positive and negative lane marking examples may be determined based on different thresholding. The thresholding may be based on the high and low intensity reflectance. For positive lane marking candidates, a high threshold may be used. Although there may be false negatives, the use of a high threshold ensures that positive marking points are accurately identified. For negative lane marking candidates, a low threshold may be used. While a low threshold may miss some negative pixels, those identified as negative lane marking are accurately identified. Thresholding based on intensity may be used only on the point cloud data based two-dimensional images in order to identify lane markings for a training set. Two-dimensional images created from point cloud data may be formed in the same image size as the street level images. The registration of the two-dimensional point cloud data based image and the other image input may be performed by a mutual information registration approach using camera calibration techniques and image registration techniques. For example, the camera projection matrix may be estimated by maximizing the mutual information between the camera images and projected point cloud features as shown in Equation 1:

$$P_{MI} = \arg\max_{P} I(x; x_P).\qquad\text{Eq. 1}$$

where P is the camera projection matrix, x and $x_p$ are the corresponding image and projected point cloud data features where arg max is a process to maximize mutual information I for camera projection matrix P. Mutual information $I(x; x_p)$ could be expressed in terms of entropy in Equation 2:

$$I(x;x_p)=H(x)+H(x_p)-H(x;x_p)\qquad\text{Eq. 2}$$

as H(x) remains constant and $H(x_p)$ is approximately constant, maximization of mutual information is approximated as minimization of the joint entropy $H(x; x_p)$ over camera projection matrix P. This registration algorithm may be performed by a graphical application programming interface (e.g., OpenGL) for each iteration. This registration process reduces alignment errors to one to three pixels.

In act S113, lane marking candidates of the received image data are determined based on the determined lane marking candidates of the registered two-dimensional image. The resulting identified lane marking candidates may be cropped into image patches containing positive and/or negative examples of lane markings.

Figure 6:
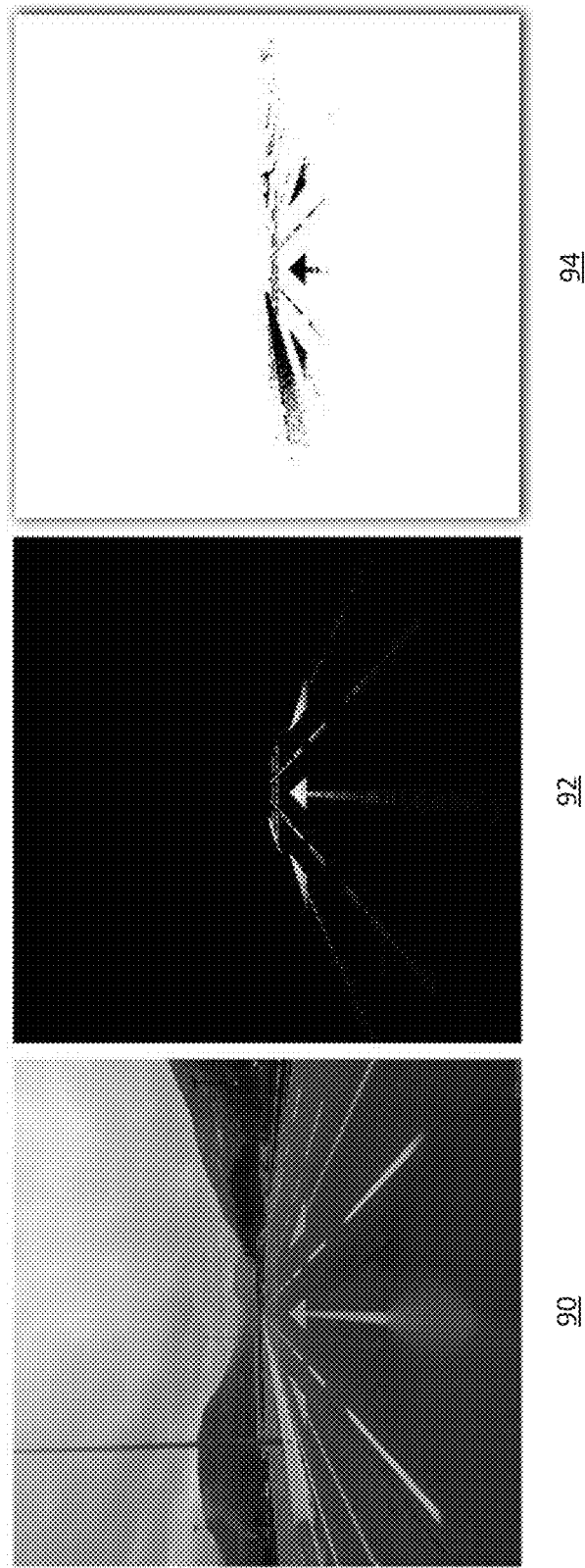
FIG. 6 illustrates a road image and its corresponding positive and negative lane marking masks.
Figure 7:
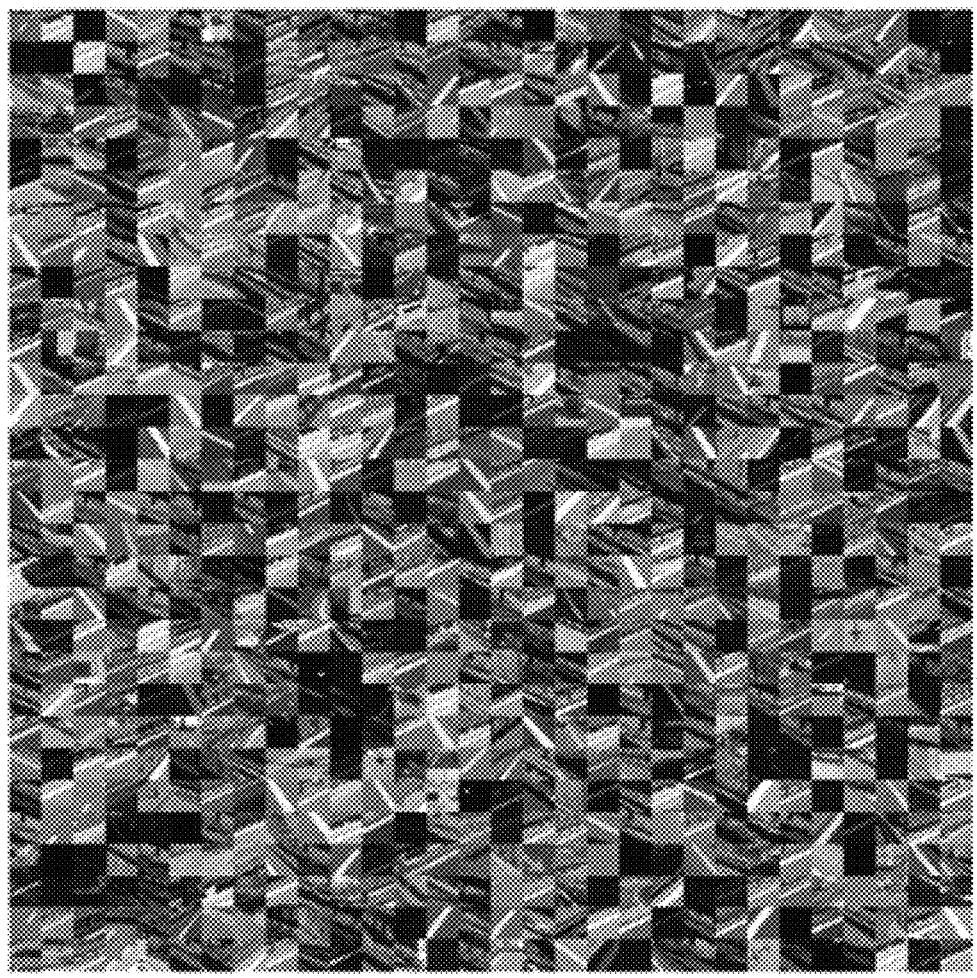
FIG. 7 illustrates positive lane marking image patches for use with training.
Figure 8:
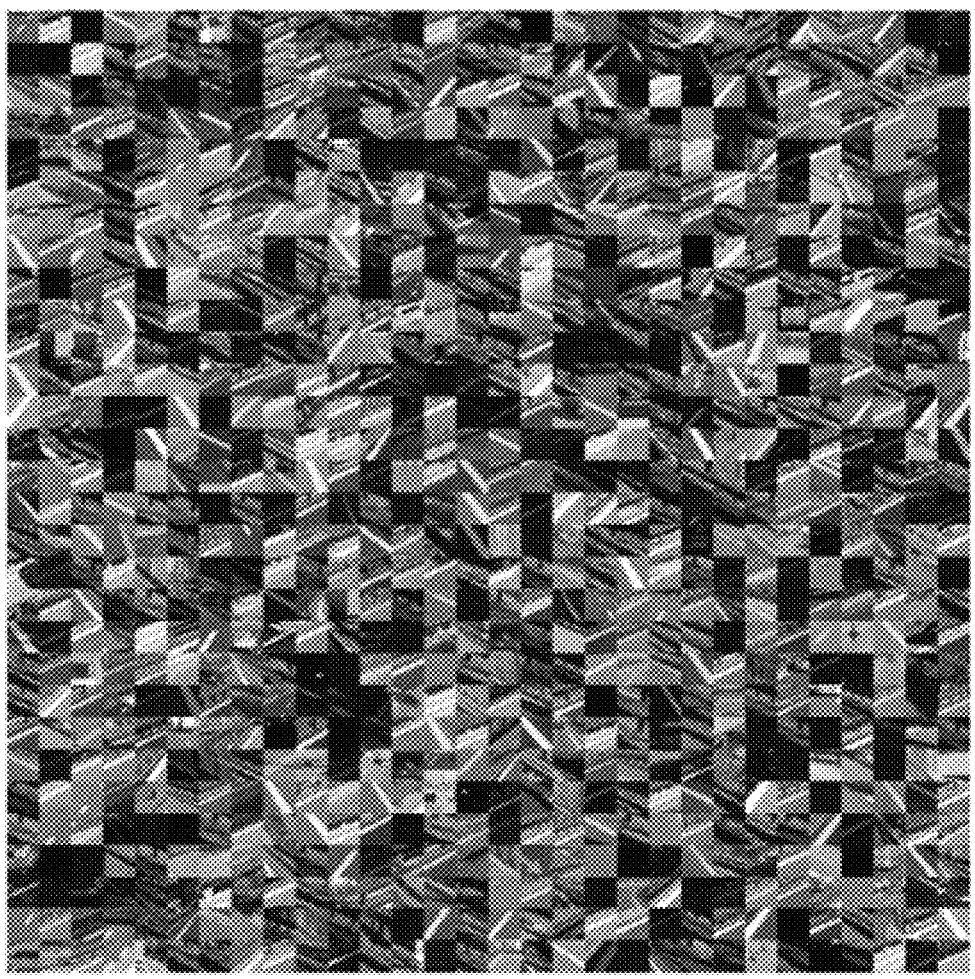
FIG. 8 illustrates negative lane marking image patches for use with training.

In act S115, a plurality of image patches from the registered two-dimensional image and from the registered image data are selected based on the determined lane markings. The image patches may constitute a small window surrounding projected pixels that have been identified as lane marking candidates. Similarly, images may constitute a small window surrounding projected pixels that have been identified as negative examples of non-lane marking candidates. FIG. 6 illustrates street level image 90 and its corresponding positive image mask 92 and negative image mask 94. Examples of positive image patches are illustrated in FIG. 7. Each of the squares of positive image patches 96 illustrate a separate, positive lane marking example. Examples of negative image patches are illustrated in FIG. 8. Each of the squares of negative image patches 98 illustrate a separate, negative lane marking example.

Figure 2:
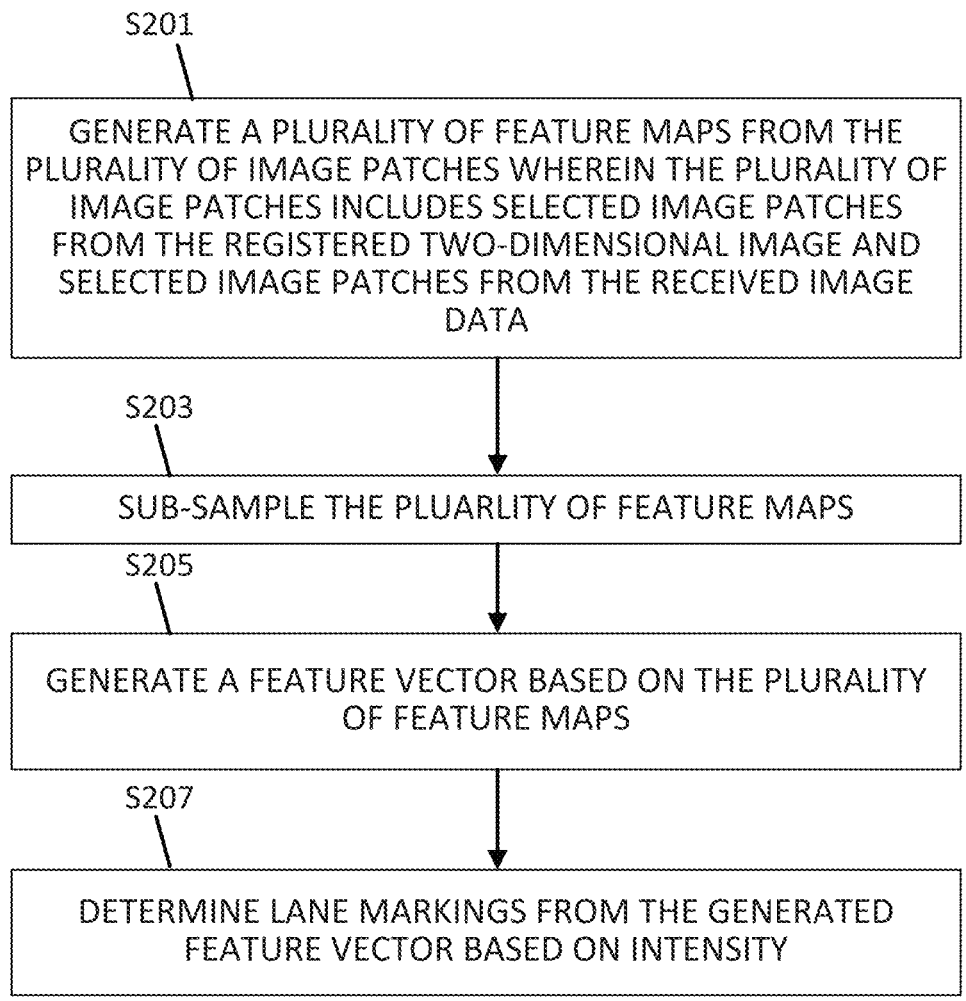
FIG. 2 is a flow diagram in accordance with the subject technology for lane classification.

Once the training data set is constructed, the CNN may be trained using the training data set. FIG. 2 is a flow chart of a method of the subject technology for lane classification that may be performed by server 125 for training of the CNN. Additional, different, or fewer acts may be provided. Acts may be performed in orders other than those presented herein. In one example, the training data set may include 30,000 image patches of size 64×64 pixels from both color images and the corresponding processed point cloud data two-dimensional representations. The label of an image patch may be set to 1 to denote the patch contains a lane marking if the center pixel of the patch is 1 and the percentage of pixels that are lane markings in the patch is above twenty percent. The label of an image patch may be set to 0 denoting non-lane marking otherwise.

In act S201 a plurality of feature maps is generated via processor 300 of server 125 from the plurality of image patches wherein the plurality of image patches includes selected image patches from the registered two-dimensional image and selected image patches from the received image data. In act S203, the plurality of feature maps is sub-sampled. In act S205, a feature vector based on the plurality of feature maps is generated using a linear function. In act S207, lane markings are determined from the generated feature vector based on intensity. CNN pipelines are further illustrated in FIGS. 4, 5, and 9.

Figure 4:
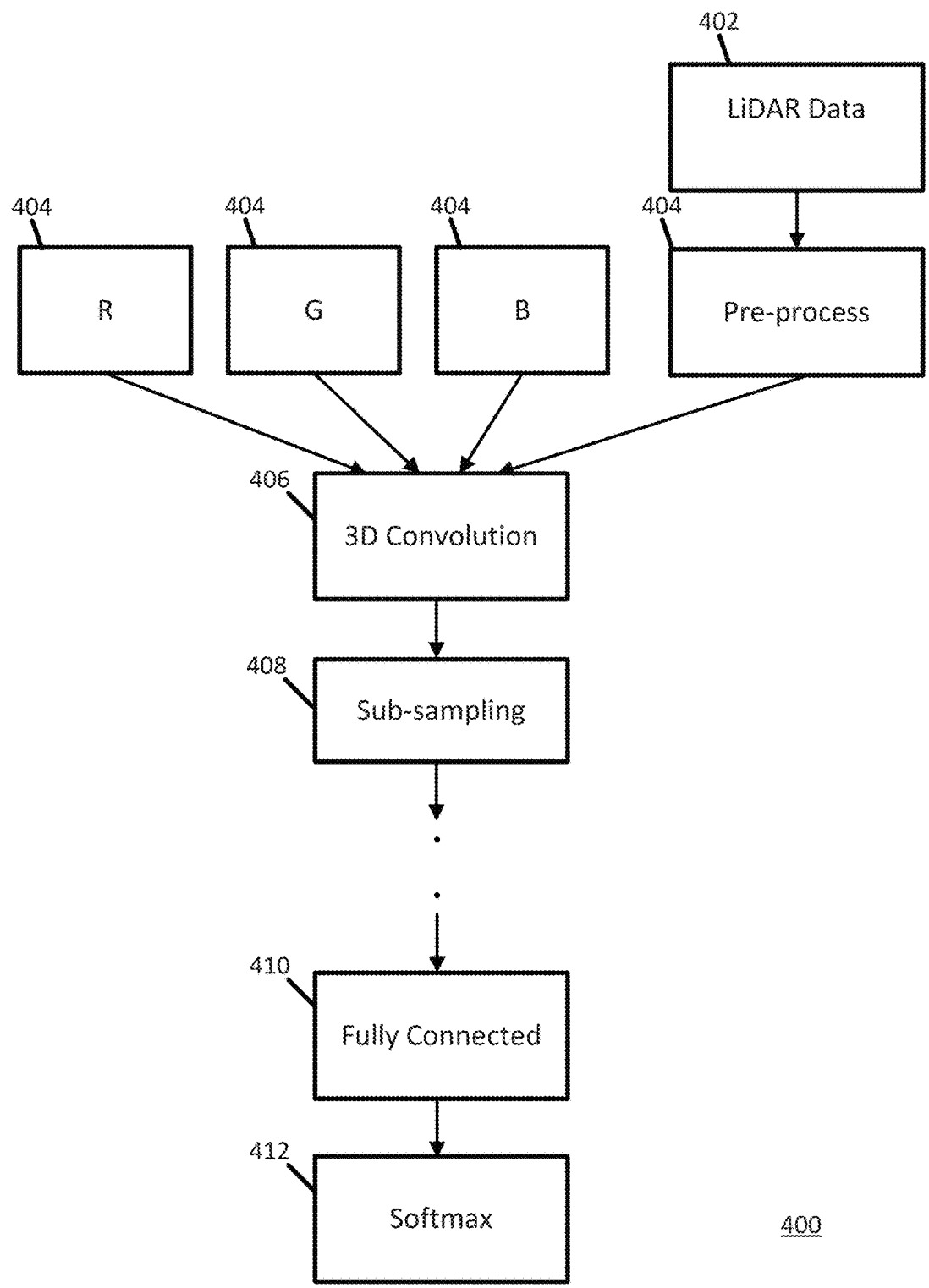
FIG. 4 illustrates an example sequential diagram in accordance with the subject technology for lane classification.

As illustrated in FIG. 4, the CNN pipeline 400 may include three-dimensional convolution of the input channels. LiDAR data 402 may be pre-processed 404 before being input as a separate channel with the color images separated into separate channels for red 404, green 404, and blue 404. Convolution 406 may occur as a three dimensional convolution, followed by sub-sampling 408. The CNN pipeline 400 continues with the generation of fully connected layers 410 and may conclude with a softmax function 412.

Figure 5:
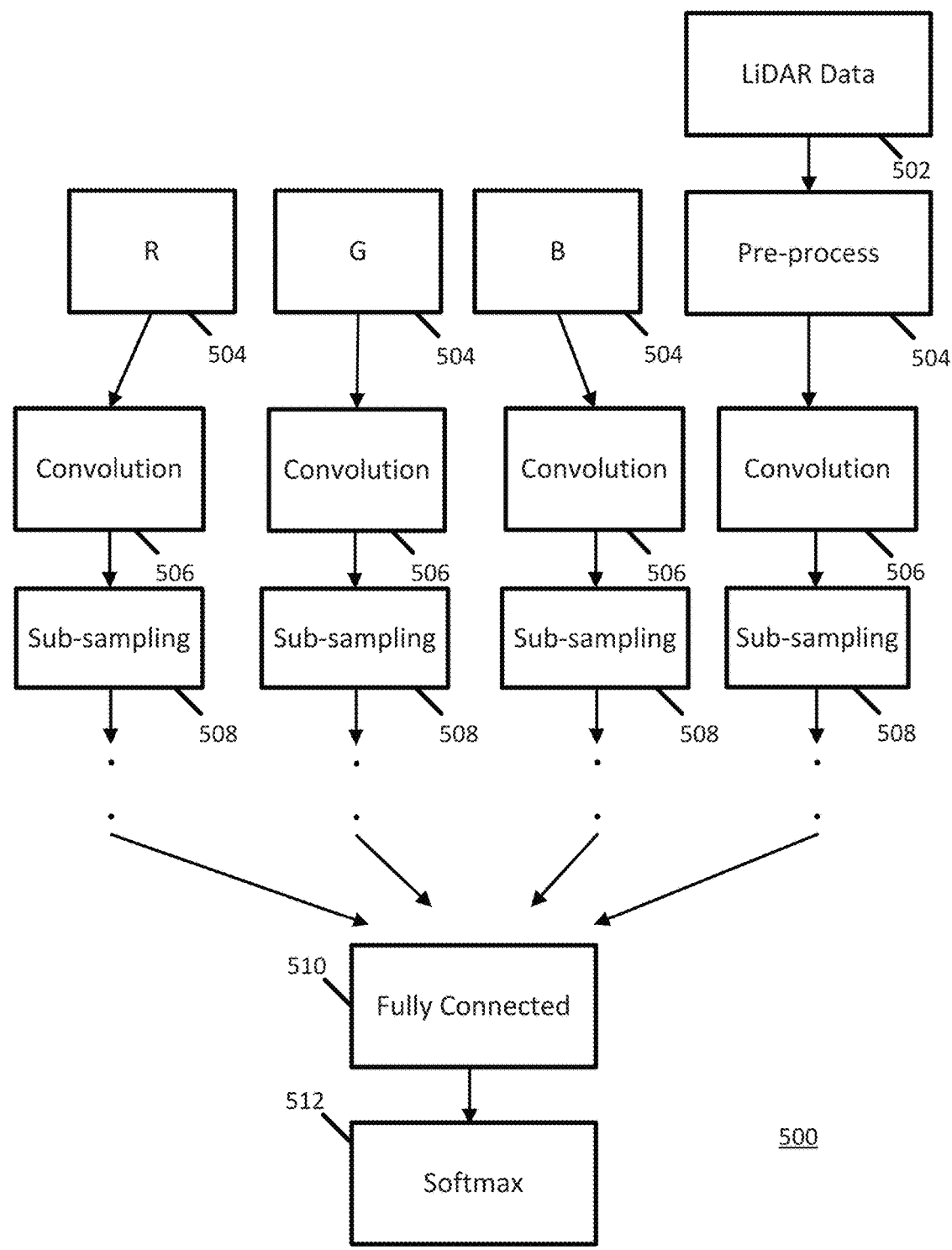
FIG. 5 illustrates an example sequential diagram in accordance with the subject technology for lane classification.

As illustrated in FIG. 5, the CNN pipeline 500 may include convolution and sub-sampling of each channel conducted separately. LiDAR data 502 may be pre-processed 404 before being input as a separate channel with the color images separated into separate channels for red 504, green 504, and blue 504. Convolution 506 is then conducted for each channel followed by sub-sampling 508. Fully connected layer 510 is then formed followed by softmax function 512.

Figure 9:
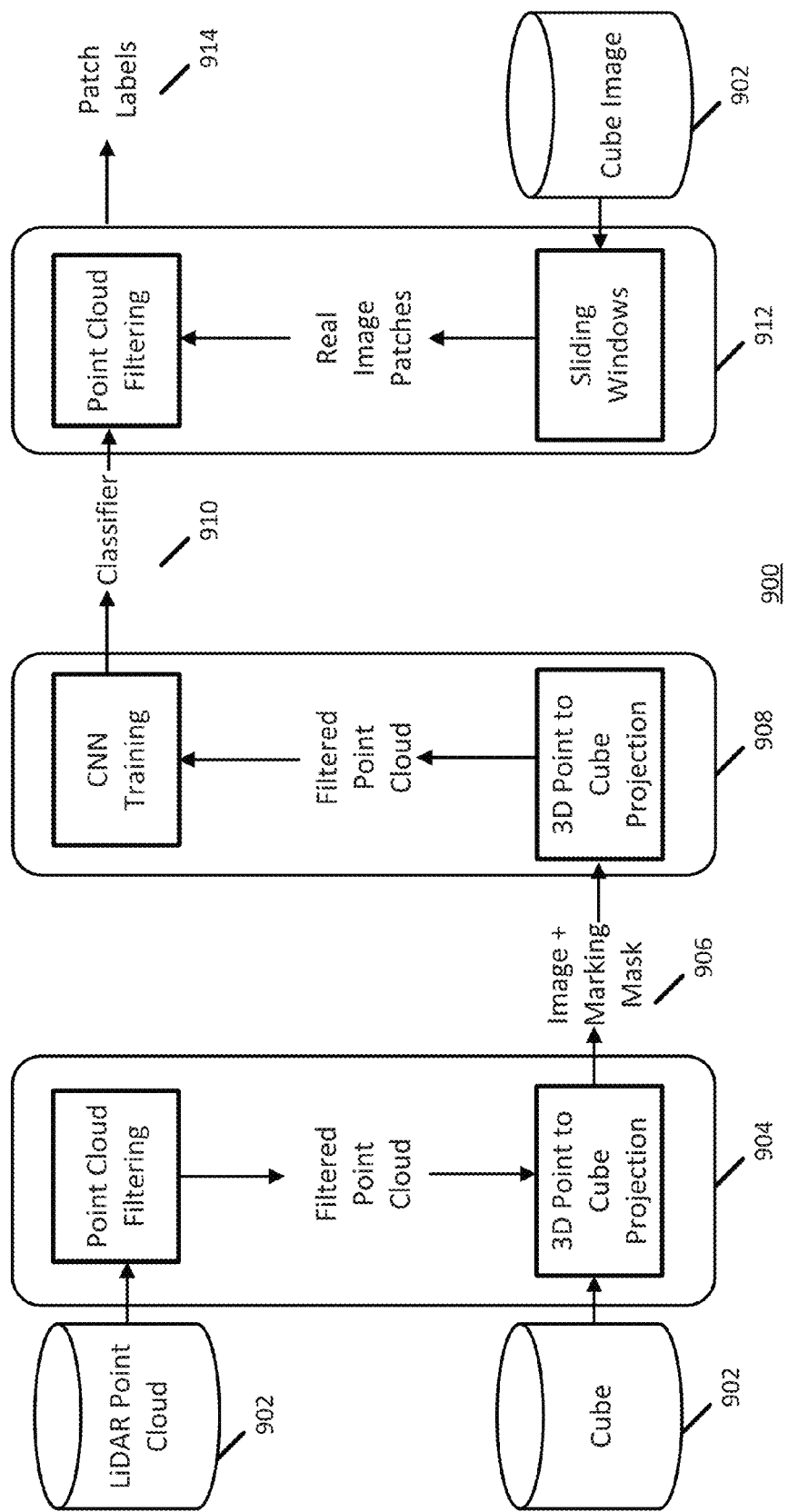
FIG. 9 illustrates an example sequential diagram in accordance with the subject technology for lane classification.

FIG. 9 illustrates a system 900 for lane classification. Preliminary input 902 into the system to develop a training set of data include the LiDAR Point Cloud data and Cube data. Training images are preprocessed 904 including point cloud filtering which may segment the ground from the remaining portions of the point cloud, and projecting portions of the point cloud to cube imagery. following preprocessing 904, images with marking masks 906 are output. Training 908 of the CNN receives the image and marking mask 906 and results in a classifier 910 including a set of kernels for lane marking. The classifier 910 is input into the detector 912 along with street level images from cube images 902. Detector 912 uses a sliding window approach to classify lane markings of the input cube images 902 through the CNN, classifier 910 and point cloud filtering. Patch labels 914 result from the system 900. FIG. 9 illustrates a sequential diagram for a system 900 for lane classification including pre-processing of point cloud data, CNN training, and lane identification. Inputs 902 to the system are LiDAR Point Cloud data, cube, and cube image data. Cube and cube image data may include vehicle based image captures from vehicles with cameras facing left, right, front, back, top, and bottom. Preliminary input 902 into the system to develop a training set of data include the LiDAR Point Cloud data and Cube data. Training images are preprocessed 904 including point cloud filtering which may segment the ground from the remaining portions of the point cloud, and projecting portions of the point cloud to cube imagery. following preprocessing 904, images with marking masks 906 are output. Marking masks 906 may include a binary mask image using white pixels to indicate road surface and black pixels to indicate non-road surfaces. Training 908 of the CNN receives the image and marking mask 906 and results in a classifier 910 including a set of kernels for lane marking. The classifier 910 is input into the detector 912 along with street level images from cube images 902. Detector 912 uses a sliding window approach to classify lane markings of the input cube images 902 through the CNN, classifier 910 and point cloud filtering. Patch labels 914 result from the system 900. Patch labels may constitute either a marking or non-marking image patch. A marking image patch may include a label "1" to identify the image patch as a lane marking. Non-marking image patches may include a label "0" to identify that the image patch is not a lane marking. The image patch may constitute a 64×64 pixel patch and a marking image patch may be defined as such if the center pixel is identified as a lane marking and the remaining pixels are identified as lane markings above a certain threshold (such as greater than 20% of the pixels are identified as positive examples of lane markings). The label of the image patch may be set to "0" to indicate non-marking or negative if these conditions are not met.

Convolution layers are applied to extract features. The convolution may be defined by Equation 3:

$$I_{ij}^{xy}=f(b_{ij}+\Sigma_m \Sigma p=0^{K-1}\Sigma_{q=0}^{K-1}\Sigma_{d=0}^{K-1}a_{md}^{pq}I_{(i-1)}^{p+x,q+y})$$ Eq. 3 where $I_{ij}^{xy}$ is the value at position (x,y) in the jth feature map in the ith layer, $b_{ij}$ is the bias for this feature map, d is the index of feature maps in the (i−1)th layer, m is the index of M kernels applied for the (i−1)th layer, $a_{md}^{pq}$ is the value at the position (p,q) in the mth kernel connected to the dth feature map in the previous layer, $I_{(i-1)}^{p+x,q+y}$ is the value at position (p+x, q+y) in the dth feature map in the (i−1)th layer, and f is the sigmoid function $f(t)=1/(1+e^{-t})$.

Multiple layers of convolution may be applied to the multi-channel input. Input channels may include channels for point cloud data and a channel for each of red, blue, and green (or alternatively hue, saturation, and value when the color space has been transformed to the HSV color space) for the color images. Alternatively, three input channels may be used in the HSV color space (hue, value, and point cloud data). The image size for each input channel may be static as 64×64 pixels, with a 5×5 pixels sliding window. In one exemplary embodiment, a first convolutional layer with 32 kernels of size 5×5×4 pixels (5×5×3 if only three channels are used) with a stride of 1 pixel may be used. The outputs from the first convolutional layer C1 may contain 32 feature maps of size 60×60 pixels (60=64−5+1). In the subsequent layer S2, rectified linear units (ReLU) and 2×2 pixel max-pooling may be applied to each feature map in the C1 layer. The resulting output is thirty-two 30×30 pixel feature maps. A convolution layer C2 with 32 kernels of size 5×5×4 pixels (5×5×3 if only three channels are used) may then be applied to the outputs from the S1 layer to generate 32 feature maps of size 26×26 pixels. After layer S2, 32 13×13 feature maps are generated. The next convolution layer C3 has 64 5×5×4 pixel kernels (5×5×3 if only three channels are used) and generates 64 9×9 pixel feature maps. The fully connected layer after S3 is applied to generate a 128×1 pixel feature vector. The output from the last fully-connected layer serves as input to a softmax layer defined as Equation 4:

$$c_j = \frac{\exp(f_j(I))}{\sum_{k=0}^{1} \exp(f_k(I))}$$ Eq. 4 where j=0,1, represents two classes, lane markings and non-markings, $f_k(I)$ is a linear function combining the fully connected features from the previous layer, and $c_j$ denotes the predicted conditional probability. The model may be optimized using a stochastic gradient descent. In the exemplary embodiment, batch size may be set to 100, momentum to 0.9, and weight decay to 0.004. The original image frame may be subdivided into smaller image patches and the learned CNN model may be applied to each image patch.

Deep machine learning uses the image patches which collectively constitute a training set so that a classifier is built. The classifier is then used to classify each pixel in a street level image and its accompanying point cloud data, so that each pixel can be classified as a marking or non-marking pixel. A sliding window approach may be used to classify each pixel. Accordingly, the classifier uses the information of the entire window for the decision of the center pixel. Noise present in the determined lane markings may be further refined by image processing.

Figure 3:
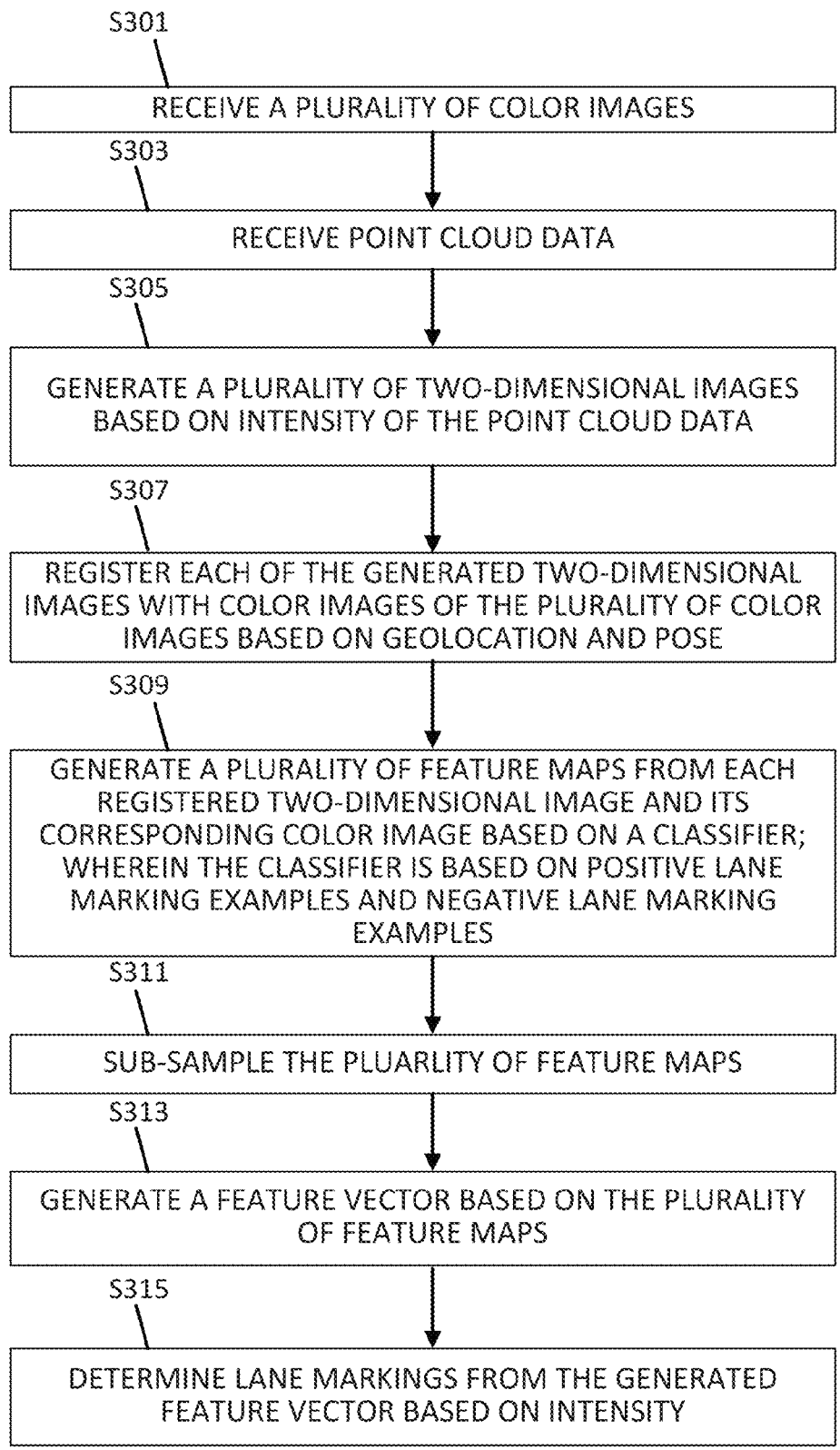
FIG. 3 is a flow diagram in accordance with the subject technology for lane classification.

Using techniques described with reference to FIGS. 1 and 2, FIG. 3 is a flow diagram of a method of analyzing images using the classifier built from the training set. Some or all of the steps may be performed by processor 300 of server 125. Alternately, the classifier and CNN may be partially or completely stored on memory 204 of mobile device 122. Classification of marking may additionally be performed by processor 200 of mobile device 122.

In act S301, a plurality of color images is received. In act S303, point cloud data is received. In act S305, a plurality of two-dimensional images is generated based on intensity of the point cloud data. In act S307, each of the generated two-dimensional images are registered with color images of the plurality of color images based on geolocation and pose.

In act S309, a plurality of feature maps are generated from each registered two-dimensional image and its corresponding color image based on a classifier; wherein the classifier is based on positive lane marking examples and negative lane marking examples. In act S311, the plurality of feature maps are sub-sampled. Acts S309 and S311 may occur in multiple layers. That is, some embodiments may include multiple convolutional and sub-sampling layers. In some embodiments, a first sub-sampling layer may occur following the first convolutional layer. Subsequent additional layers of convolution and sub-sampling may follow. In act S313, a feature vector is generated based on the plurality of feature maps. Act S313 may have additional layers of feature vector generation. In act S315, lane markings are determined from the generated feature vector based on intensity.

Figure 10:
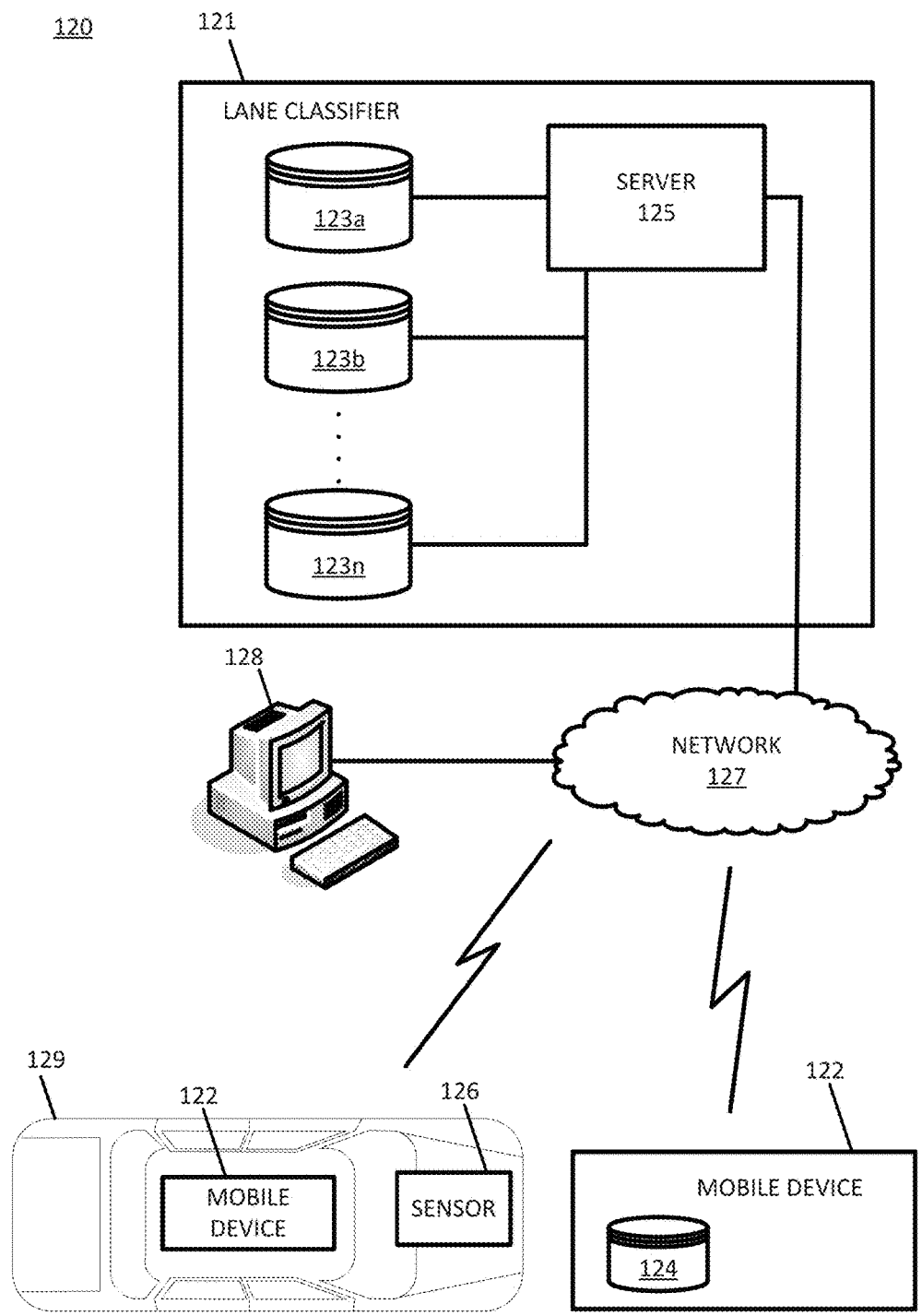
FIG. 10 illustrates an example system of the subject technology for lane classification.

FIG. 10 illustrates an example system 120 for lane classification. The system 120 includes a classification system 121, one or more mobile devices 122 (navigation devices), a workstation 128, and a network 127. The system may further include a vehicle 129 including a mobile device 122 and a sensor 126. Additional, different, or fewer components may be provided. For example, many mobile devices 122 and/or workstations 128 connect with the network 127. The classification system 121 includes a server 125 and one or more databases. The server 125 may maintain multiple databases 123a, 123b . . . 123n. The term database and refers to a set of data stored in a storage medium and may not necessarily reflect specific any requirements as to the relational organization of the data. The term server is used herein to collectively include the computing devices at the lane classifier 121 for creating, maintaining, and updating the multiple databases 123a-n. Any computing device may be substituted for the mobile device 122. The computing device may be a host for a website or web service such as a mapping service or a navigation service. A mapping service may provide maps generated from the databases 123a-n using lane classification information, and the navigation service may calculate routing or other directions from the geographic data and lane classification information of the databases 123a-n.

Figure 11:
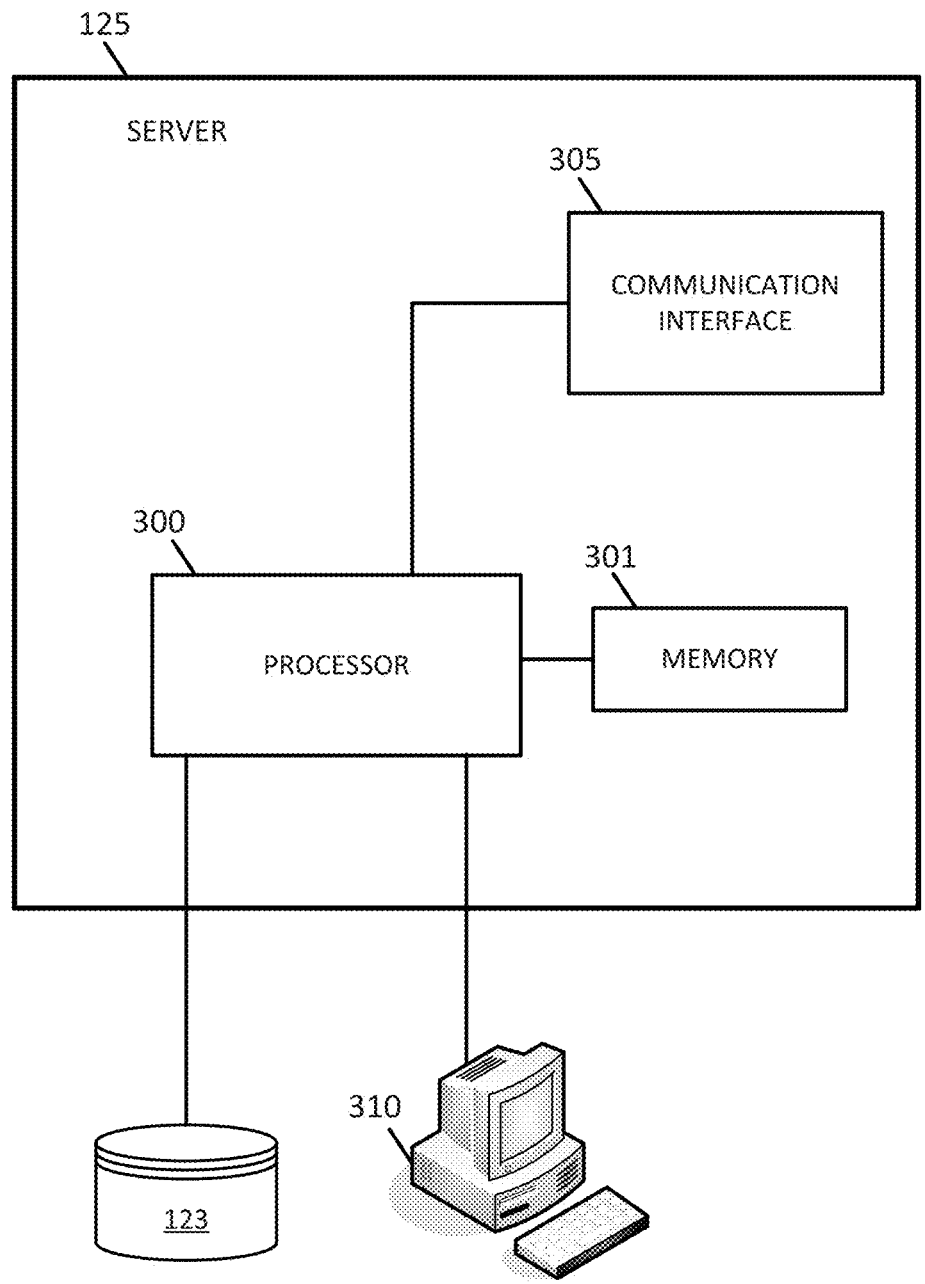
FIG. 11 illustrates an example server of the subject technology for lane classification.

The database 123a-n may include a road imagery database including street level images, point cloud data, classifier data, and/or existing map data. As shown in FIG. 11, a master copy of the database 123a may be stored at the classification system 121, and the databases 123b-n may include alternative versions or past versions of the lane classifications associated with navigation maps. The master copy of the database 123a may be the most current or up to date copy of the database. In addition, the mobile device 122 may store a local copy of the database 124. In one example, the local copy of the database 123b is a full copy of the database, and in another example, the local copy of the database 124 may be a cached or partial portion of the database.

The local of the database 124 may include data from various versions of the database 123a-n. The cached portion may be defined based on a geographic location of the mobile device 122 or a user selection made at the mobile device 122. The server 125 may send lane classifier information to the mobile device 122.

The mobile device 122 may be a personal navigation device (PND), a portable navigation device smart phone, a mobile phone, a personal digital assistant (PDA), a car, a tablet computer, a notebook computer, and/or any other known or later developed connected device or personal computer. Non-limiting embodiments of navigation devices may also include relational database service devices, mobile phone devices, or car navigation devices. The vehicle 129 with mobile device 122 and sensor 126 may be an autonomous driving vehicle, a data acquisition vehicle, or a vehicle equipped with navigation or other communication capabilities.

The classification system 121, the workstation 128, the mobile device 122, and vehicle 129 are coupled with the network 127. The phrase "coupled with" is defined to mean directly connected to or indirectly connected through one or more intermediate components. Such intermediate components may include hardware and/or software-based components.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

FIG. 11 illustrates an example server 125. The server 125 includes a processor 300, a communication interface 305, and a memory 301. The server 125 may be coupled to a database 123 and a workstation 310. The workstation 310 may be used to enter data regarding point cloud data, images, map data, thresholds, and classifier information including convolutional kernels. The database 123 may include information entered from workstation 310, point cloud data, images, map data, thresholds, and classifier information. Additional, different, or fewer components may be provided in the server 125. FIGS. 1-3 illustrate example flow diagrams for the operation of server 125. Additional, different, or fewer acts may be provided.

Figure 12:
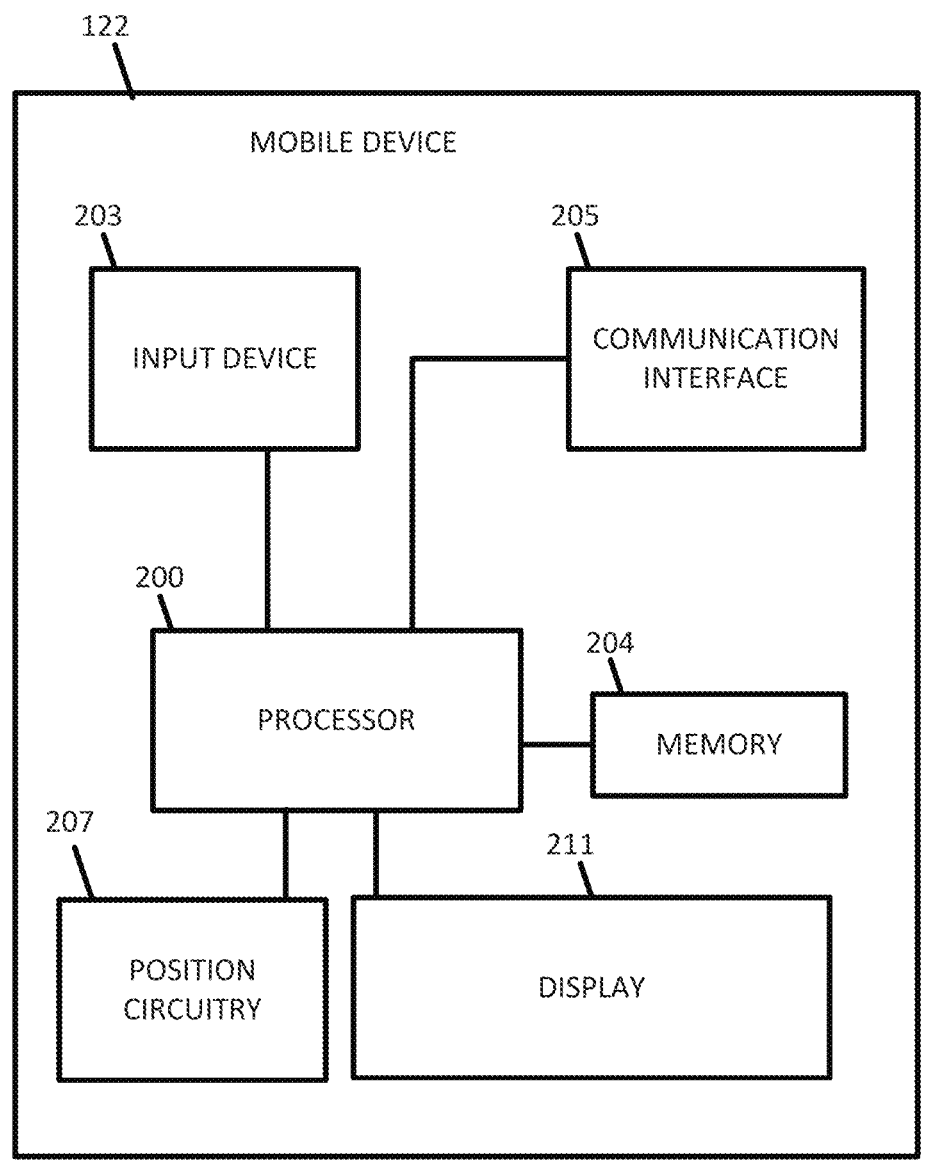
FIG. 12 illustrates an example mobile device of the subject technology for lane classification.

FIG. 12 illustrates an exemplary mobile device 122 of the system of FIG. 10. The mobile device 122 includes a processor 200, a memory 204, an input device 203, a communication interface 205, position circuitry 207, and a display 211. Additional, different, or fewer components are possible for the mobile device 122.

The mobile device 122 (or navigation device 122) is configured to execute mapping algorithms to determine an optimum route to travel along a road network from an origin location to a destination location in a geographic region. Mobile device 122 may be configured to acquire imagery or other data along with geolocation and pose information. Using input from the end user, the navigation device 122 may examine potential routes between the origin location and the destination location to determine the optimum route. The navigation device 122 may then provide the end user with information about the optimum route in the form of guidance that identifies the maneuvers required to be taken by the end user to travel from the origin to the destination location. Some navigation devices 122 show detailed maps on displays outlining the route, the types of maneuvers to be taken at various locations along the route, locations of certain types of features, and so on.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
  receiving point cloud data;
  segmenting a ground plane from the point cloud data;
  generating a two-dimensional image of the segmented ground plane based on intensity values of the segmented ground plane;
  determining lane marking candidates based on intensity within the generated two-dimensional image;
  receiving image data;
  registering the generated two-dimensional image with the received image data;
  determining lane marking candidates of the received image data based on the determined lane marking candidates of the registered two-dimensional image; and
  selecting a plurality of image patches from the registered two-dimensional image and from the registered image data based on the determined lane markings.

2. The method of claim 1, further comprising:
  generating a plurality of feature maps from the plurality of image patches wherein the plurality of image patches includes selected image patches from the registered two-dimensional image and selected image patches from the received image data;
  sub-sampling the plurality of feature maps;
  generating a feature vector based on the plurality of feature maps; and
  determining lane markings from the generated feature vector based on intensity.

3. The method of claim 1, wherein determining lane marking candidates within the further comprises:
  applying a positive threshold to determine lane marking candidates; and
  applying a negative threshold to determine negative lane marking candidates, wherein the positive threshold is higher than the negative threshold.

4. The method of claim 1, wherein registering the generated two-dimensional image with the received image data is based on lane markings.

5. The method of claim 1, further comprising:
  increasing the contrast of the generated two-dimensional image based on intensity values of the segmented point cloud data.

6. The method of claim 1, wherein segmenting the ground plane further comprises one of thresholding based on height, the normal of a plurality of points of the three-dimensional point cloud, or plane fitting.

7. The method of claim 1, further comprising
  smoothing gaps between projected points on the generated two-dimensional image.

8. The method of claim 1, wherein determining lane marking candidates based on intensity within the generated two-dimensional image comprises:
  computing the convex hull of white pixels of the generated two-dimensional image.

9. The method of claim 2, wherein generating the plurality of feature maps further comprises:
  determining the classification of each pixel based on a sliding window.

10. The method of claim 1, wherein the received image data comprises at least one color image.

11. The method of claim 10, further comprising:
  transforming a color space of the received image data.

12. The method of claim 1, wherein the received point cloud data and the received image data include geoposition information and pose information.

13. The method of claim 1, wherein the point cloud data and the image data are collected simultaneously.

14. An apparatus comprising:
  at least one processor; and
  at least one memory including computer program code for one or more programs; the at least one memory and the computer program code configured to, with the at least one processor, cause the apparatus to at least perform:
  receive point cloud data;
  segment a ground plane from the point cloud data;
  generate a two-dimensional image of the segmented ground plane based on intensity values of the segmented ground plane;
  determine lane marking candidates based on intensity within the two-dimensional image;
  receive image data;
  register the generated two-dimensional image with the received image data;
  determine lane marking candidates of the received image data based on the determined lane marking candidates of the registered two-dimensional image;
  select a plurality of image patches from the two-dimensional image and from the received image data based on the determined lane markings;
  generate a plurality of feature maps from the plurality of image patches wherein the plurality of image patches includes selected image patches from the registered two-dimensional image and selected image patches from the received image data;
  sub-sample the set of feature maps;
  generate a feature vector based on the set of feature maps; and
  determine lane markings from the generated feature vector based on intensity.

15. The apparatus of claim of claim 14, the at least one memory and the computer program code configured to, with the at least one processor, cause the apparatus to at least perform:
  apply a positive threshold to determine the presence of lane marking candidates; and
  apply a negative threshold to determine an absence of lane marking candidates, wherein the positive threshold is higher than the negative threshold.

16. The apparatus of claim 14, the at least one memory and the computer program code configured to, with the at least one processor, cause the apparatus to at least perform:
  increase the contrast of the generated two-dimensional image based on intensity values of the segmented point cloud data.

17. The apparatus of claim 14, the at least one memory and the computer program code configured to, with the at least one processor, cause the apparatus to at least perform:
  smooth gaps between projected points on the generated two-dimensional image.

18. A non-transitory computer readable medium including instructions that when executed are operable to:
  receive a plurality of color images;
  receive point cloud data;
  generate a plurality of two-dimensional images based on intensity of the point cloud data;

register each of the generated two-dimensional images with color images of the plurality of color images based on geolocation and pose;

generate a plurality of feature maps from each registered two-dimensional image and its corresponding color image based on a classifier; wherein the classifier is based on positive lane marking examples and negative lane marking examples;

sub-sample the plurality of feature maps;

generate a feature vector based on the plurality of feature maps; and determine lane markings from the generated feature vector based on intensity.

19. The non-transitory computer readable medium of claim 18, including instructions that when executed are operable to:

smooth gaps between projected points on the determined lane markings.

20. The non-transitory computer readable medium of claim 18, including instructions that when executed are operable to:

apply the classifier to each pixel of the of each registered two-dimensional image and its corresponding color image based on a sliding window.

* * * * *